United States Patent [19]
Olonde et al.

[11] Patent Number: 5,492,983
[45] Date of Patent: Feb. 20, 1996

[54] CATALYSTS AND PROCESS FOR THE PREPARATION OF CATALYSTS WHICH MAY BE USED FOR THE POLYMERIZATION OF ETHYLENE

[75] Inventors: Xavier Olonde, Neuville En Ferrain; Karel Bujadoux, Lens; André Mortreux, Hem; Francis Petit, deceased, late of Villeneuve d'Ascq, all of France, By Michèle Petit, legal representative

[73] Assignee: ECP Enichem Polymeres France, Courbevoie, France

[21] Appl. No.: 244,679

[22] PCT Filed: Oct. 8, 1993

[86] PCT No.: PCT/FR93/00996

§ 371 Date: Jun. 7, 1994

§ 102(e) Date: Jun. 7, 1994

[87] PCT Pub. No.: WO94/09044

PCT Pub. Date: Apr. 28, 1994

[30] Foreign Application Priority Data

Oct. 8, 1992 [FR] France .................. 92 11973

[51] Int. Cl.$^6$ ..................... C08F 4/14
[52] U.S. Cl. .................. 526/64; 526/124.7; 526/139; 526/141; 526/142; 526/143; 526/148; 526/160; 502/104; 502/110; 502/115; 502/117
[58] Field of Search .................. 502/115, 117, 502/104, 110; 526/64, 124, 139, 141, 142, 143, 148, 160

[56] References Cited

U.S. PATENT DOCUMENTS

| | | |
|---|---|---|
| 4,575,538 | 3/1986 | Hsieh et al. .................. 525/244 |
| 4,665,046 | 5/1987 | Campbell, Jr. .................. 502/102 |
| 5,066,739 | 11/1991 | Pettijohn et al. .................. 526/127 |
| 5,270,274 | 12/1993 | Hashiguchi et al. .................. 502/115 |

FOREIGN PATENT DOCUMENTS

WO86/05788 10/1986 WIPO.

OTHER PUBLICATIONS

*Webster's II New Riverside University Dictionary*, The Riverside Publishing Co., Boston, 1984, p. 171.

Primary Examiner—Romulo H. Delmendo
Attorney, Agent, or Firm—Burns, Doane, Swecker & Mathis

[57] ABSTRACT

This catalyst consists of the reaction product, with at least one organomagnesium compound and/or organolithium compound $R^1Li$ ($R^1$=alkyl) or ArLi (Ar=phenyl or benzyl), of the reaction product of $(Cp)_2MX_2Li(OR_2)_2$ (M=lanthanide, Sc, Y; (Cp)=optionally substituted cyclopentadienyl; and R=alkyl), with at least one bidentate ligand, such as β-diketone or β-keto imine $CZ_3COCHZCDCZ_3$, Z selected from halogen, alkyl and H, D=O, NH or $NR^3$ ($R^3$ =alkyl or aryl); and phosphorus ylid $R^2{}_3P{=}CA{-}CO{-}R^2$, $R^2$ chosen from alkyl and aryl; A=alkyl or H. It advantageously takes the form of a solution at least partially containing an aromatic hydrocarbon. The process for the polymerization of ethylene may be carried out at 20°–250° C. at a pressure which may range up to approximately 200 bars, in solution or in suspension in an at least $C_6$ inert hydrocarbon or may be carried out continuously, in at least one autoclave or tubular reactor, at 150°–300° C., at 400–2000 bars, the reaction medium being in the supercritical state.

21 Claims, No Drawings

CATALYSTS AND PROCESS FOR THE PREPARATION OF CATALYSTS WHICH MAY BE USED FOR THE POLYMERIZATION OF ETHYLENE

The present invention relates to catalysts and to a process for the preparation of polymerization catalysts, as well as to a process for the polymerization of ethylene using the said catalysts.

It is known to polymerize ethylene in a wide range of temperatures and pressures using catalysts and catalytic systems containing transition metal derivatives and organometallic derivatives. These catalytic systems, known as Ziegler-Natta catalytic systems, have been continuously improved in order to increase their activity. As a result, the catalytic residues only persist in trace amounts in the polymer, which it would be uneconomical to wish to remove by processing. The contents present are, at the present time, ecotoxicologically acceptable.

However, insofar as the presence of the catalytic residue in the polymer is inevitable, even at extremely low contents, at the detection limit, a search has been made for catalysts which could be selected such that their residues, as infinitesimally small as they are, present no health or environmental risk.

The elements of the lanthanide family feature among those whose salts and derivatives are known to display no toxicity. The Applicant has thus attempted to replace the Ziegler-Natta catalytic systems by catalysts containing compounds of lanthanides or of related metals.

It is known from document WO-A-86 05788 to polymerize olefins at a pressure of approximately 1 bar and at a temperature between −78° and +80° C. using a catalyst comprising a compound of the Cp'$_2$MR or Cp'$_2$MH type in which Cp' is the pentamethylcyclopentadienyl radical, M is chosen from lanthanum, neodymium, samarium and lutetium, R is a very bulky alkyl radical such as the bis(trimethylsilyl)methyl radical of formula —CH[Si(CH$_3$)$_3$]$_2$ or such as the mesityl radical of formula:

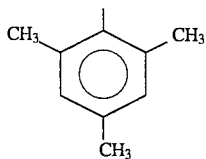

The synthesis of these compounds is very complicated. In particular, that of the compounds of formula Cp'$_2$MH requires a hydrogenation, followed by a filtration, washing and drying.

With an aim of simplification, the Applicant has sought to rid itself of the latter steps of the synthesis of these compounds, particularly the separation steps. It has also sought to avoid the use of reactants possessing bulky groups (trimethylsilyl or mesityl). The Applicant has thus attempted to develop a polymerization catalyst from the product of the first step of the reaction sequence described in the document WO-A-86 05788, or from an analogous product.

The subject of the present invention is thus, first of all, a catalyst for the polymerization of ethylene, characterized in that it consists of the reaction product, with at least one reactant chosen from organomagnesium compounds and organolithium compounds of formula R$^1$Li in which R$^1$ is an alkyl radical containing not more than 12 carbon atoms, or of formula ArLi in which Ar is the phenyl ring or the benzyl radical C$_6$H$_5$—CH$_2$—, of the product of reaction of a compound of formula (I):

$$(Cp)_2MX_2Li(OR_2)_2 \qquad (I)$$

in which:

M represents a metal chosen from the lanthanides, scandium and yttrium;

(Cp) represents an optionally substituted cyclopentadienyl radical;

(Cp)$_2$ may also represent a set of two cyclopentadienyl radicals linked by a divalent radical;

R represents an alkyl radical having from 1 to 8 carbon atoms; and

X represents a halogen, with at least one bidentate ligand capable of providing a suitable catalyst for the polymerization of ethylene, in particular a bidentate ligand which is capable of bonding to the metal M of the compound (I) by forming a ring with it, in particular a 5–6 membered ring, via two bonds each between the metal M and an oxygen and/or phosphorus and/or nitrogen atom.

Neodymium, samarium, lanthanum, lutetium and ytterbium may in particular be mentioned as metal M entering into the definition of the compounds of formula (I). Preferably, (Cp) is the pentamethylcyclopentadienyl radical, R is the ethyl radical and X is chlorine.

The bidentate ligands are in particular chosen from β-diketones or β-keto imines of the formula (IIa):

in which:

the Z groups may be identical or different and are independently chosen from halogen, alkyl radicals, in particular C$_1$–C$_6$ alkyl, and hydrogen; and D represents O, NH or NR$^3$, R$^3$ representing alkyl, in particular C$_1$–C$_{12}$ alkyl, or aryl, in particular phenyl;

the phosphorus ylids of formula (IIb):

in which:

the R$^2$ groups may be identical or different and are independently chosen from alkyl radicals, in particular C$_1$–C$_{12}$ alkyl, and aryl radicals, for example phenyl or tolyl; and A represents an alkyl radical, in particular C$_1$–C$_6$ alkyl, or hydrogen.

The catalyst according to the present invention advantageously takes the form of a solution at least partially containing an aromatic hydrocarbon, in which solution the concentration, expressed as metal M, is advantageously between 0.1 and 100 mmol/liter. As regards the bidentate ligands and the reactants which may be used, the details concerning them are outlined hereinafter.

Another subject of the present invention thus consists of a process for the preparation of a catalyst for the polymerization of ethylene, characterized in that:

in a first step, the compound of formula (I) is prepared:

$$(Cp)_2MX_2Li(OR_2)_2 \qquad (I)$$

in which (Cp), M, X and R are as defined above;

in a second step, the said compound (I) is reacted with at least one bidentate ligand as defined above, in particular chosen from β-diketones and β-keto imines of the formula (IIa) as defined above, and the phosphorus ylids of the formula (IIb) as defined above; and in a third step, the product resulting from the second step is reacted with at least one reactant chosen from the organomagnesiums and the organolithium compounds of formula $R^1Li$, in which $R^1$ is an alkyl radical containing not more than 12 carbon atoms, or of formula ArLi in which Ar is the phenyl ring or the benzyl radical $C_6H_5$—$CH_2$—.

The first step in the preparation of the catalyst, which is known per se, consists in reacting butyllithium with a substituted or unsubstituted cyclopentadiene in order to obtain a cyclopentadienyllithium, and in then reacting this compound with an anhydrous halide of the metal M, generally in tetrahydrofuran (THF) at reflux, the reaction being followed by evaporation of the THF, extraction with ether and evaporation of the ether from the liquid phases until a concentrated solution is obtained, which is cooled to between 0° and −20° C. and left in this way to allow the crystals of the expected compound of formula (I) to form.

In a second step, the compound $(Cp)_2MX_2LI(OR_2)_2$ is, for example, reacted with a β-diketone of formula (IIa) with D=0, such as hexafluoroacetylacetone $CF_3COCH_2COCF_3$, or a β-keto imine of formula (IIa) with D=NH or $NR^3$, such as

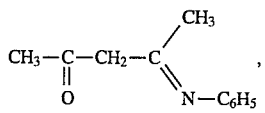

or a phosphorus ylid of formula (IIb), such as benzoylmethylenetriphenylphosphorane $Ph_3P=CH$—CO—Ph or benzoylmethylenetri-n-butylphosphorane $Bu_3P=CH$—CO—Ph, generally under an inert gas at atmospheric pressure.

In the first case, the reaction is generally carried out at a temperature approximately between −100° C. and +110° C.; in the second case, it is generally carried out at a temperature approximately between −80° C. and +110° C. The second step is generally performed by placing a solution of the compound (I) together with a solution of the bidentate ligand. The molar ratio of the bidentate ligand to the compound (I) is generally from 1 to 3.

According to the present invention, the product obtained at the end of the second step, in the isolated state or in solution in the reaction medium, is reacted with an organomagnesium or an organolithium.

Among the organomagnesiums, at least one compound of formula R—Mg—R' is preferably chosen, in which R and R', which may be identical or different, are substituted or unsubstituted alkyl radicals having from 1 to 8 carbon atoms. n-Butylethylmagnesium, dibutylmagnesium, di(n-hexyl)magnesium or n-butyl-n-octylmagnesium is advantageously used. The organomagnesium compound may also be a mixed organomagnesium such as allylmagnesium chloride.

Among the organolithiums, methyllithium, n-butyllithium, tert-butyllithium or phenyllithium is advantageously selected.

The third step of the process for the preparation of the catalyst is advantageously carried out at a temperature between −10° and +30° C., generally under an inert gas at atmospheric pressure. This third step is preferably carried out by placing a solution of the product from the second step, it being advantageously possible for the said product, as outlined above, to be present in the reaction medium which has been used for its preparation, together with a stirred solution of the reactant. The reactant (organomagnesium or organolithium) is also in solution in a suitable solvent, for example toluene, benzene, cyclohexane, a saturated aliphatic hydrocarbon or a saturated aliphatic hydrocarbon fraction, or alternatively tetrahydrofuran in the case of allylmagnesium chloride.

The reaction time for this third step may vary within broad limits ranging from a few minutes to several hours. The catalyst thus obtained is advantageously used within the following 15 to 150 minutes after mixing of the product of the second step and the reactant, but it can be stored for 3 to 4 days without showing any substantial decrease in activity.

One variant of the process according to the invention consists in carrying out the reaction between the product of the second step and the reactant in an aromatic hydrocarbon, followed by addition of a further amount of reactant dissolved in a saturated aliphatic hydrocarbon, for example a $C_{10}$–$C_{12}$ saturated aliphatic hydrocarbon fraction.

The amount of reactant reacted with the product of the reaction of the compound $(Cp)_2MX_2Li(OR_2)_2$ with the bidentate ligand is such that the molar ratio of the metal of the reactant (Mg or Li) to the metal M is at least equal to 1, preferably between 2 and 25 and advantageously between 2 and 10.

According to the preferred embodiment of the preparation process, the catalyst is obtained in the state of a slightly opalescent solution, generally in a mixture of solvents. Its concentration may be adjusted to the desired value, by evaporation under vacuum or alternatively by addition of solvent, before its use for the polymerization of ethylene. Its concentration of metal M is advantageously between 0.1 and 100 mmol/liter and preferably between 0.2 and 20 mmol per liter.

Another subject of the present invention consists of a process for the polymerization of ethylene, characterized in that it consists in using as catalyst at least one catalyst as defined above and/or as obtained by means of the preparation process described above.

The process for the polymerization of ethylene may be carried out at a temperature between 20° and 250° C., preferably between 50° and 200° C., at a pressure which may range up to approximately 200 bars, in solution or in suspension in an inert hydrocarbon having at least 6 carbon atoms, such as a $C_{10}$–$C_{12}$ saturated aliphatic hydrocarbon fraction.

The process for the polymerization of ethylene may also be carried out in a continuous mode, in at least one autoclave or tubular reactor, at a temperature approximately between 150° and 300° C. and at a pressure approximately between 400 and 2000 bars, the reaction medium being in the supercritical state.

In order to adjust the molecular weight of the polyethylene obtained and its melt index, the process may be performed in the presence of up to 2% by volume of a transfer agent such as hydrogen or alternatively by diluting the medium with propane or butane (up to 50% by volume).

By varying the Mg/M (or Li/M) ratio, the polymerization temperature and pressure and the amount of transfer agent, it is possible to obtain linear polyethylenes displaying a very large variety of molecular weights (ranging from a few hundred to several hundreds of thousands of g/mole), of polydispersity indices (Mw/Mn) and of melt indices (from approximately 1 to the equivalent of at least 1000 according to the standard ASTM D1238 condition E), with high catalytic yields which may range up to about fifty kg of polyethylene per millimole of metal M for the highest yields hitherto observed in a continuous regime.

These high yields make it possible to use the catalyst at extremely low concentrations in ethylene for polymerization, for example in the region of the equivalent of $3\times10^{-3}$ millimole of metal M per liter of ethylene.

It will be noticed that, in contrast with the conventional Ziegler-Natta catalysts, the catalysts prepared according to the invention do not require to be activated, for example using an organoaluminium activator.

The polyethylene obtained by means of the polymerization process according to the invention finds applications and uses in very varied, well-known areas, depending on its polydispersity index and its melt index. The manufacture of very varied finished articles may be mentioned (films, sheets, rods, containers etc.) by extrusion blow-moulding, extrusion using a sheet die, blow-moulding of hollow substances, injection-moulding etc.

The aim of the examples which follow is to illustrate the invention in a nonlimiting manner.

I - EXAMPLES 1 to 15 - PREPARATION OF THE CATALYST

All the manipulations were carried out under an atmosphere of dry and deoxygenated nitrogen or argon, with reactants which were themselves suitably purified.

1) Example 1 - Preparation of the Precursor (M=Nd)

Lithium bis(pentamethylcyclopentadienyl)dichlorobis(diethyl ether)neodymate III, of formula $Cp*_2NdCl_2Li(OEt_2)_2$, referred to below as "the precursor", was prepared according to the reaction scheme:

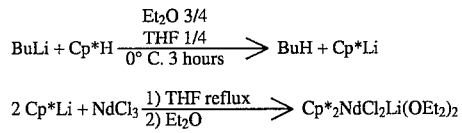

Bu being the n-buryl radical, Cp* is the pentamethyl cyclopentadienyl radical, $Et_2O$ is diethyl ether $(C_2H_5)_2O$, THF is tetrahydrofuran and $NdCl_3$ neodymium trichloride.

a) Preparation of Cp*Li 4.9 g of Cp*H (35.8 mmol) was introduced into a Schlenk tube of capacity 300 ml, followed by 50 ml of THF and 100 ml of $Et_2O$. The whole was cooled to 0° C. using an ice-bath. An ether solution of BuLi (prepared by dilution, in 50 ml of $Et_2O$ at 0° C., of 3.6 ml of a solution containing 10 moles of BuLi per liter in hexane) was added dropwise at 0° C. to the previous solution with vigorous stirring over 1½ hours. A voluminous white precipitate of Cp*Li was formed. The reaction was left to continue at 20° C. for 3 hours and the gelatinous suspension was then filtered.

The white precipitate of Cp*Li was washed with 20 ml of $Et_2O$ and pre-dried under a stream of argon and under a slight vacuum. The product was subsequently transferred to a Schlenk tube and then dried under vacuum at 20° C. for 1 hour.

b) Preparation of the Precursor 4.7 g of Cp*Li (33 mmol), obtained as described above, and 4.14 g of anhydrous $NdCl_3$ (16.5 mmol) were suspended in 170 ml of THF in a Schlenk tube. A condenser was attached to the Schlenk tube and the THF was brought to reflux for 12 hours. A short time after the start of the reflux, the solids ($NdCl_3$ and Cp*Li) dissolved to give a clear violet solution.

The THF was evaporated off at 20° C. under vacuum and the solid obtained was placed under vacuum for 2 hours at 20° C. and subsequently extracted twice with 110 ml of $Et_2O$. When the ether is added, the solution is stirred for approximately ½ an hour and LiCl then sediments out upon settling. The supernatant solution was transferred to another Schlenk tube. The ether fractions were combined and then concentrated to 110 ml by evaporation of the ether at 20° C. under vacuum. The solution was then gradually cooled to 0° C. and then to −20° C. over 2 days. Large violet crystals of formula $Cp*_2NdCl_2Li(OEt_2)_2$ were obtained.

2) Example 2 - Preparation of the Precursor (M=La)

The precursor $Cp*_2LaCl_2Li(OEt_2)_2$ was prepared as in Example 1, except $NdCl_3$ was replaced with $LaCl_3$.

2.84 g of Cp*Li (20 mmol) are added to 2.55 g of anhydrous $LaCl_3$ suspended in 140 cm³ of THF in a Schlenk tube. A condenser is then attached to the Schlenk tube. The THF is brought to reflux (67° C.) for 18 hours. A short time after the start of the reflux, the solids ($LaCl_3$ and Cp*Li) dissolve to give a clear whitish solution.

The THF is evaporated off at 20° C. under vacuum. The solid obtained is placed under vacuum for 2 hours at a temperature of 0° C. and is then extracted with 5 times with 50 cm³ of $Et_2O$ at 0° C. LiCl sediments out upon settling. The supernatant solution is transferred to another Schlenk tube, still at a temperature of 0° C. The ether fractions are combined and then concentrated to ⅔ by evaporation of the ether under vacuum at a temperature of 0° C. The solution is then gradually cooled to −20° C. over 2 days. A white microcrystalline powder of $[Cp*_2LaCl_2Li(OEt_2)_2]$ is recovered.

3) Example 3 - Preparation of the Precursor (M=Y)

The precursor $Cp*_2YCl_2Li(OEt_2)_2$ was prepared as in Example 1, except $NdCl_3$ was replaced with $YCl_3$.

2.84 g of Cp*Li (20 mmol), obtained as described above, and 0.899 g of anhydrous $YCl_3$ (10 mmol) were suspended in 170 ml of THF in a Schlenk tube. A condenser was attached to the Schlenk tube and the THF brought to reflux for 12 hours. A short time after the start of the reflux, the solids ($YCl_3$ and Cp*Li) dissolved to give a clear colourless solution.

The THF was evaporated off at 20° C. under vacuum and the solid obtained was placed under vacuum for 2 hours at 20° C. and was subsequently extracted twice with 110 ml of $Et_2O$. When the ether is added, the solution is stirred for approximately ½ an hour and LiCl then sediments out upon settling. The supernatant solution was transferred to another Schlenk tube. The ether fractions were combined and then concentrated to 110 ml by evaporation of the ether at 20° C. under vacuum. The solution was then gradually cooled to 0° C. and then to −20° C. over 2 days. Large white crystals of formula $Cp*_2YCl_2Li(OEt_2)_2$ were obtained.

4) Example 4 - Preparation of the Precursor (M=Sm)

The precursor $Cp*_2SmYCl_2Li(OEt_2)_2$ was prepared as in Example 1, except $NdCl_3$ was replaced with $SmCl_3$.

1.42 g of Cp*Li (10 mmol), obtained as described above, and 1.284 g of anhydrous $SmCl_3$ (5 mmol) were suspended in 170 ml of THF in a Schlenk tube. A condenser was attached to the Schlenk tube and the THF brought to reflux for 12 hours. A short time after the start of the reflux, the solids ($SmCl_3$ and Cp*Li) dissolved to give a clear orange solution.

The THF was evaporated off at 20° C. under vacuum and the solid obtained was placed under vacuum for 2 hours at 20° C. and was subsequently extracted twice with 110 ml of $Et_2O$. When the ether is added, the solution is stirred for approximately ½ an hour and LiCl then sediments out upon settling. The supernatent solution was transferred to another Schlenk tube. The ether fractions were combined and then concentrated to 110 ml by evaporation of the ether at 20° C. under vacuum. The solution was then gradually cooled to 0° C. and then to −20° C. over 2 days. Large orange crystals of formula $Cp*_2SmCl_2Li(OEt_2)_2$ were obtained.

5) Example 5 - Prepararation of the Reaction Product of the Precursor of Example 1 and Hexafluoroacetylacetone 2 mmol of hexafluoroacetylacetone ($CF_3COCH_2COCF_3$) dissolved in 100 ml of toluene are added slowly, with stirring and at −80° C., to a solution of $Cp*_2NdCl_2Li(OEt_2)_2$ (2 mmol) in toluene. The colour gradually changes from blue to red and, when the addition is finished, the temperature of the solution is brought slowly to 20° C.

6) Example 6 - Preparation of the Reaction Product of the Precursor of Example 1 and Benzoylmethylenetriphenylphosphorane 1.92 g of $Cp*_2NdCl_2Li(OEt_2)_2$ (3 mmol) are dissolved in 50 ml of toluene. A solution of 1.14 g of benzoylmethylenetriphenylphosphorane ($Ph_3P=CH-CO-Ph$) in 100 ml of toluene is added slowly to this solution at 20° C. The colour of the solution changes slowly from blue to green. The mixture is stirred overnight at 20° C. The toluene is completely evaporated off and the remaining green solid is washed twice with 10 ml of pentane and is dried under vacuum.

7) Examples 7 to 9 - Preparation of the Reaction Products of the Precursors of Examples 2 to 4 Respectively and Benzoylmethylenetriphenylphosphorane The reaction of the precursors $Cp*_2LaCl_2Li(OEt_2)_2$, $Cp*YCl_2Li(OEt_2)_2$ and $Cp*SmCl_2Li(OEt_2)_2$ respectively with benzoylmethylenetriphenylphosphorane is carried out under the same conditions as in Example 6, still using 3 millimoles of the precursor for 3 millimoles of the bidentate ligand. Products of yellow colour are obtained.

8) Example 10 - Preparation of the Reaction Product of the Precursor of $Cp*_2YCl_2Li(OEt_2)_2$ and Benzoylmethylenetri-n-butylphosphorane 0.585 g of $Cp*_2YCl_2Li(OEt_2)_2$ (1 mmol) is dissolved in 50 ml of toluene. A solution of 0.32 g (1 mmol) of benzoylmethylenetri-n-butylphosphorane ($Bu_3P=CH-CO-Ph$) in 100 ml of toluene is added slowly to this solution at 20° C. The colour of the solution changes slowly to pale yellow. The mixture is stirred overnight at 20° C.

9) Examples 11 to 15 - Preparation of the Actual Catalyst

The actual catalyst was obtained in each case by reacting the reactant n-butylethylmagnesium with the reaction product obtained in Examples 5, 6, 8, 9 and 10 respectively (Examples 11 to 15 respectively). Depending on the polymerization conditions of the ethylene envisaged (see Examples below), the reaction was carried out either in the polymerization reactor or outside the latter. The reaction was carried out at 20° C. for 1 hour, with stirring, the reaction product of Examples 5 and 6 respectively being diluted beforehand to approximately 10 mmol/l in toluene and the reactant also being diluted beforehand, to a concentration of approximately 0.5 mole per liter in toluene. The catalyst solution obtained may subsequently be diluted to the desired concentration. In all the cases, the molar ratio of the metal of the reactant (namely Mg) to the metal M is 3.

II - EXAMPLES 16 to 29 - POLYMERIZATION

1) Examples 16 to 22 - Polymerization at a Pressure of 6 Bars 600 ml of a $C_{10}-C_{12}$ saturated hydrocarbon fraction was introduced into an autoclave reactor of capacity 1 liter, fitted with stirring and temperature control means, which was flushed with nitrogen while raising the temperature to the selected value. Ethylene was then introduced up to a pressure of 6 bars, followed by the catalyst (0.1 mmol expressed as Nd for Examples 16, 17 and 19, 0.05 mmol expressed as Nd for Example 18 and 0.03 mmol expressed as M for Examples 20 to 22). The pressure of 6 bars was maintained for 1 minute.

The contents of the reactor were then discharged and the polymer was separated out, washed, dried and weighed. The amount obtained Q is expressed in grams per millimole of metal M per minute per mole.$l^{-1}$ of ethylene in the case of Examples 16, 18 and 20 to 22 (polymerization at 160° C.), and in grammes per millimole of neodymium per minute per bar, in the case of Examples 17 and 19 (polymerization at 60° C.).

The catalyst used, the test temperature (T, expressed in °C.), the amount Q of polyethylene obtained, its number average molecular weight Mn (determined by gel permeation chromatography (GPC) in the same way as for the weight average molecular weight Mw), and its polydispersity index (Mw/Mn) are featured in Table I for each of Examples 16 to 22.

TABLE I

| Example | M | Precursor according to Example | Precursor-ligand reaction product according to Example | Catalyst according to Example | T | Q | Mn | Mw/Mn |
| --- | --- | --- | --- | --- | --- | --- | --- | --- |
| 16 | Nd | 1 | 5 | 11 | 160 | 1440 | 700 | 1.5 |
| 17 | Nd | 1 | 5 | 11 | 60 | 3.6 | 18500 | 5.7 |
| 18 | Nd | 1 | 6 | 12 | 160 | 4150 | 600 | 1.3 |
| 19 | Nd | 1 | 6 | 12 | 60 | 15 | 27000 | 7.2 |
| 20 | Y | 3 | 8 | 13 | 160 | 5170 | n.d. | n.d. |
| 21 | Sm | 4 | 9 | 14 | 160 | 5200 | n.d. | n.d. |
| 22 | Y | 3 | 10 | 15 | 160 | 5070 | n.d. | n.d. | n.d.: not determined

Compared with the system $Cp*_2NdCl_2Li(OEt_2)_2$/BuMgEt, the system of Example 12 displays an activity which is multiplied by at least a factor of 3. The case is substantially the same for the systems of Examples 13–15 and of Example 14 compared with the systems $Cp*_2YCl_2Li(OEt_2)_2$/BuMgEt and $Cp*_2SmCl_2Li(OEt_2)_2$/BuMgEt respectively.

2) Examples 23 to 25 - Polymerization at a Pressure of 6 Bars in the Presence of a Transfer Agent and/or a Diluent 600 ml of a $C_{10}-C_{12}$ saturated hydrocarbon fraction and 50 ml of an a-olefin as transfer agent and/or diluent were introduced into an autoclave reactor of capacity 1 liter, fitted with stirring and temperature control means, which was flushed with nitrogen while raising the temperature to the selected value. Ethylene was then introduced up to a pressure of 6 bars, followed by the catalyst (0.1 mmol expressed as Nd). The pressure of 6 bars was maintained for 1 minute.

ethylene.

TABLE III

| Example | P | T | B | $R_c$ | C | MI | Mn | Mw/Mn | J | d |
|---------|------|-----|----|------|------|------|-------|-------|-------|-------|
| 26 | 1200 | 200 | 0 | 20.5 | 12.3 | 19.8 | 24500 | 1.8 | 134.5 | 0.962 |
| 27 | 800 | 180 | 22 | 18 | 9.5 | 14.2 | 27000 | 1.9 | 134.5 | 0.960 |
| 28 | 800 | 180 | 35 | 22.6 | 13 | 31.2 | 23700 | 1.8 | 133 | 0.961 |

The contents of the reactor were then discharged and the polymer was separated out, washed, dried and weighed.

Table II below indicates, for each example, the catalyst used, the α-olefin used, the polymerization temperature T, expressed in °C., the number average molecular weight Mn and the polydispersity index Mw/Mn for the polyethylene obtained.

TABLE II

| Example | Catalyst of Example | α-Olefin | T (°C.) | Mn | Mw/Mn |
|---------|---------------------|----------|---------|-------|-------|
| 23 | 12 | 4-Methyl-1-pentane | 160 | 650 | 1.4 |
| 24 | 12 | 4-Methyl-1-pentene | 60 | 65850 | 3.1 |
| 25 | 12 | 1-Hexene | 60 | 24250 | 7 |

3) Examples 26 to 28 - Polymerization at a Pressure of 800 or 1200 Bars in the Presence, Where Appropriate, of a Tranfer Agent and/or a Diluent The polymerization plant operates on a continuous regime and comprises a thermostatted, stirred autoclave reactor supplied with ethylene by means of 2 compressors arranged in series, the first compressor additionally receiving the unreacted ethylene originating from a separator into which the product from the reactor flows continuously. The separator is arranged after a pressure release valve situated at the reactor outlet and is maintained at a pressure of-approximately 8 bars.

The polymer collected at the bottom of the separator is introduced into an extrusion pump and then granulated.

Ethylene is introduced continuously into the reactor, into which is also admitted the catalyst prepared in accordance with Example 12. The ethylene flow rate is 32 kg/h. The temperature is adjusted to the desired value while the pressure is maintained at 800 or 1200 bars. The polyethylene collected after extrusion and granulation is weighed. The catalytic yield $R_c$ is expressed here in kg of polyethylene per milligram atom of neodymium, and the conversion C is in %.

In addition to the Mn and Mw, the following were determined (by GPC) on the polyethylene obtained:

melt index MI, measured according to the standard ASTM D-1238 (conditions E) and expressed in g/10 min.

the density d, measured according to the standard ASTMD-1505.

the melting point J, expressed in °C.

The conditions used and the results obtained are indicated in Table III. The concentration of the catalyst solution injected into the reactor, expressed in millimoles of neodymium per liter, is 0.5. The polymerization temperature T is expressed in °C., and the pressure P is in bars. B represents the amount of 1-butene used as diluent and/or transfer agent, in % by volume. The 1-butene did not copolymerize with the ethylene.

The catalytic yields are better than with the binary system (Cp*$_2$NdCl$_2$Li(OEt$_2$)$_2$/BuMgEt) under the same conditions (20.5 kg/mmol in Example 28 compared with 14 kg/mmol).

4) Example 29

The reaction product of Example 7, in an amount equivalent to 0.1 mmol of La, was reacted with butylethylmagnesium in an Mg/La ratio equal to 4, in 50 ml of toluene.

This solution was introduced into an autoclave reactor of capacity 100 ml containing 50 ml of toluene, flushed beforehand with nitrogen. At a temperature of °C., ethylene was then introduced up to a pressure of 50 bars, which was maintained for one hour. The activity of the catalyst is 22.5 g of polyethylene/mmol of La/h.

In the absence of step (b) for the preparation of the catalyst, the activity obtained is approximately one-third of that above.

It is claimed:

1. A process for preparing a catalyst for the polymerization of ethylene, comprising:

(a) preparing a compound of formula (I):

wherein, M represents a lanthanide, scandium, or yttrium metal; Cp represents an optionally substituted cyclopentadienyl radical and the Cp radicals are optionally radicals linked by a divalent radical; R represents an alkyl radical having from 1 to 8 carbon atoms; and X represents a halogen; and (b) reacting the compound of formula (I) with at least one bidentate ligand capable of producing a suitable catalyst for the polymerization of ethylene to form a product; and (c) reacting the product resulting from step (b) with at least one reactant chosen from organomagnesium compounds and organolithium compounds, the organolithium compounds having either the formula R'Li, in which R' is an alkyl radical containing not more than 12 carbon atoms, or the formula ArLi in which Ar is a phenyl ring or a benzyl radical C$_6$H$_5$—CH$_2$—.

2. The process of claim 1, wherein Cp is a pentamethylcyclopentadienyl radical.

3. The process of claim 1, wherein the at least one bidentate ligand is capable of bonding to the metal M of the compound of formula (I), thereby forming a ring with the metal M via two bonds, each bond having the metal M at one end thereof, and each bond having an oxygen, phosphorus, or nitrogen atom at the end opposite the metal M.

4. The process of claim 3, wherein the at least one bidentate ligand is:

β-diketones and β-keto imines of formula (IIa):

wherein, Z represents halogens, alkyl radicals, or hydrogen which are independently chosen and may be identical to or different from each other; and D represents O for the β-diketones, and NH or NR³ for the β-keto imines, wherein R³ represents alkyl or aryl radicals; or a phosphorus ylid of the formula (IIb):

wherein,

R² represents alkyl radical or aryl radical groups which are independently chosen and are identical to or different from each other; and A represents an alkyl radical or hydrogen.

5. The process of claim 4, wherein the at least one bidentate ligand is hexafluoroacetylacetone, phosphorus ylid, benzoylmethylenetriphenylphosphorane, or benzoylmethylenetri-n-butylphosphorane.

6. The process of claim 1, wherein the step (c) product is a solution comprising the catalyst and an aromatic hydrocarbon.

7. The process of claim 1, wherein the at least one reactant chosen from organomagnesium compounds and organolithium compounds is an organomagnesium compound of formula R—Mg—R', wherein R and R' are substituted or unsubstituted alkyl radicals having from 1 to 8 carbon atoms, and are identical to or different from each other.

8. The process of claim 4, wherein step (b) is carried out at a temperature between −100° C. and +110° C. and the at least one bidentate ligand is a β-diketone or a β-keto imine of formula (IIa), or at a temperature between −80° C. and +110° C. and the at least one bidentate ligand is a phosphorus ylid of formula (IIb).

9. The process of claim 1, wherein the molar ratio of the at least one bidentate ligand to the compound of formula (I) is 1 to 3.

10. The process of claim 1, wherein step (c) is carried out at a temperature between −10° C. and +30° C.

11. The process of claim 1, wherein the ratio of the metal of the at least one reactant chosen from organomagnesium compounds and organolithium compounds to the metal M, during step (c) is greater than or equal to 1.

12. The process of to claim 1, wherein in step (b), the compound of formula (I) and the at least one bidentate ligand are each in the form of a solution, and in step (c), the product of step (b) and the at least one reactant chosen from organomagnesium compounds and organolithium compounds are each in the form of a solution.

13. A catalyst for the polymerization of ethylene, made by the process of claim 1.

14. A catalyst for the polymerization of ethylene, made by the process of claim 2.

15. A catalyst for the polymerization of ethylene, made by the process of claim 3.

16. A catalyst for the polymerization of ethylene, made by the process of claim 4.

17. A catalyst for the polymerization of ethylene, made by the process of claim 6.

18. A process for the polymerization of ethylene, comprising polymerizing ethylene in the presence of at least one catalyst made by the process of claim 1.

19. The process for the polymerization of ethylene as in claim 18, wherein the process is carried out at a temperature between 20° and 250° C. at a pressure less than or equal to 200 bars, in solution or in suspension in an inert hydrocarbon having at least 6 carbon atoms.

20. The process for the polymerization of ethylene as in claim 18, wherein the process is carried out in a continuous mode, in at least one autoclave or tubular reactor, at a temperature approximately between 150° C. and 300° C., and at a pressure approximately between 400 and 2000 bars, the reaction medium being in a supercritical state.

21. The process for the polymerization of ethylene as in claim 19, wherein the inert hydrocarbon is a $C_{10}$–$C_{12}$ saturated aliphatic hydrocarbon fraction.

* * * * *